Aug. 10, 1948.　　　M. E. CHUN ET AL　　　2,446,527
PHASE SHIFT LOGGING OF WELL BORES
Filed March 28, 1942　　　　　　　　3 Sheets-Sheet 1
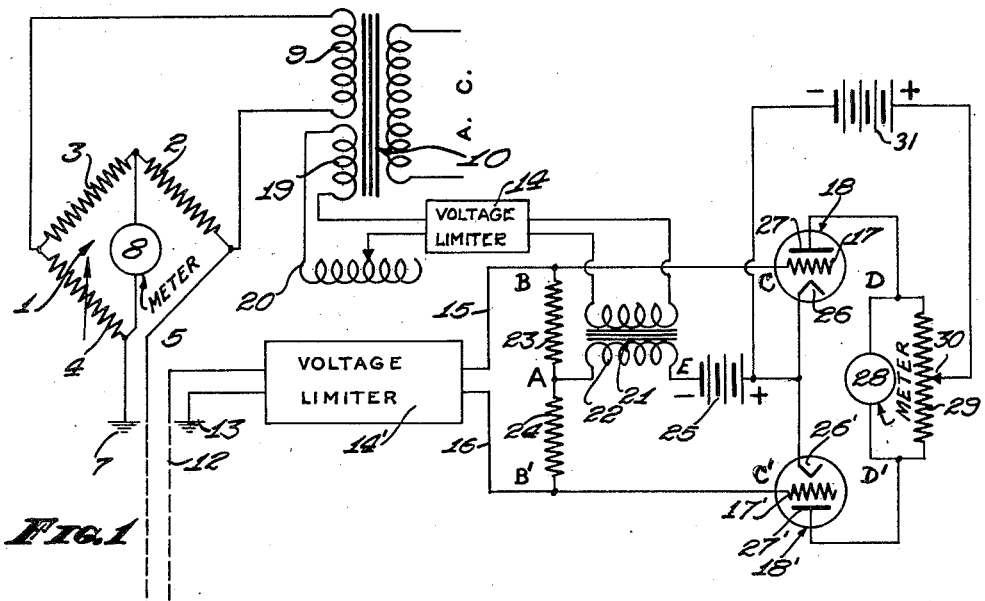
FIG.1
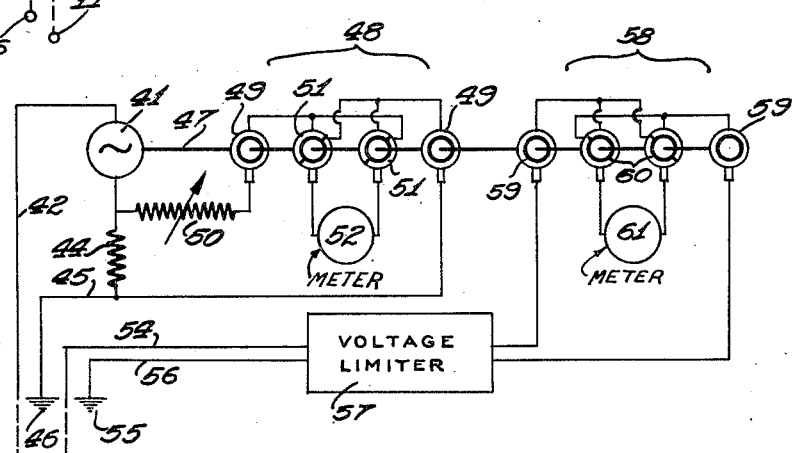
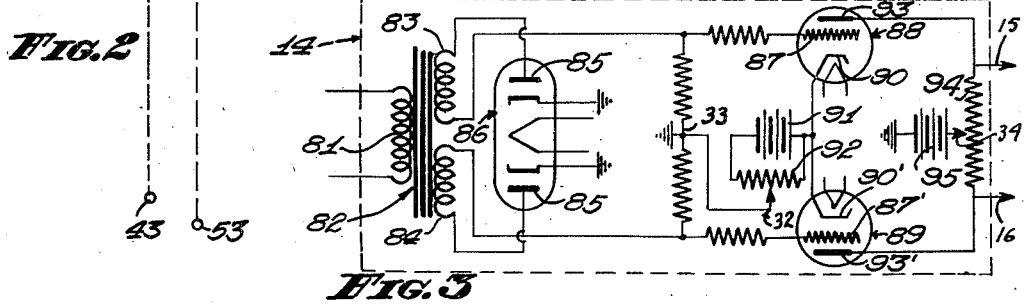
FIG.2
FIG.3
INVENTORS
MELVIN E. CHUN
JOHN C. STICK JR.
BY Floyd Spence
ATTORNEY Aug. 10, 1948.    M. E. CHUN ET AL    2,446,527
PHASE SHIFT LOGGING OF WELL BORES
Filed March 28, 1942    3 Sheets-Sheet 2

INVENTORS
MELVIN E. CHUN
BY JOHN C. STICK JR.
ATTORNEY

Aug. 10, 1948.  M. E. CHUN ET AL  2,446,527
PHASE SHIFT LOGGING OF WELL BORES
Filed March 28, 1942  3 Sheets-Sheet 3
FIG.8. (SIGNAL AT A-E) 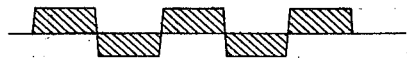
FIG.9 (SIGNAL AT A-B) 
FIG.10 (SIGNAL AT A-B') 
FIG.11 (SIGNAL AT E-C) 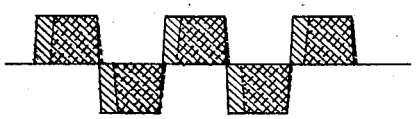
FIG.12 (SIGNAL AT E-C') 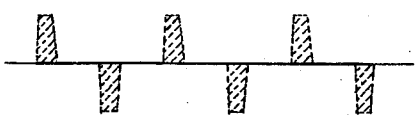
FIG.13 (SIGNAL AT D-30) 
FIG.14 (SIGNAL AT D'-30) 
FIG.15 (EFFECTIVE SIGNAL AT GALVANOMETER) D-D' 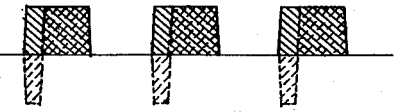
INVENTORS
MELVIN E. CHUN
JOHN C. STICK JR.
BY Floyd Spencer
ATTORNEY Patented Aug. 10, 1948

2,446,527

UNITED STATES PATENT OFFICE 2,446,527

PHASE SHIFT LOGGING OF WELL BORES

Melvin E. Chun, Huntington Park, and John C. Stick, Jr., South Pasadena, Calif., assignors to Lane-Wells Company, Los Angeles, Calif., a corporation of Delaware Application March 28, 1942, Serial No. 436,570

10 Claims. (Cl. 175—182)

1

Our invention relates to phase shift logging of well bores; that is, to the measurement of the inductive and capacitive effect of formation traversed by a well bore. Among the objects of our invention are:

First, to provide a means and method of measuring the phase shaft of an electrical field established in the formation traversed by a well bore, as may be caused by the inductive or capacitive characteristics of the formation;

Second, to provide a means and method of this character wherein much of the equipment now employed in the electrical logging of well bores by measurement of the resistivity may be utilized, so that phase shift logging may be made simultaneously with or in conjunction with conventional resistivity logging with only a minimum of change in or adjustment of the equipment; and Third, to provide a means and method of this character whereby the effects of changes in amplitude or intensity of the electrical field in the formation, as sampled on the indications of phase shift, are virtually eliminated so that an accurate determination of even small phase shifts may be had without the introduction of error due to amplitude changes.

With the above and other objects in view, as may appear hereinafter, reference is directed to the accompanying drawings, in which:

Figure 1 is a wiring diagram illustrating one manner in which our invention may be employed;

Figure 2 is another wiring diagram showing a modified form of our invention;

Figure 3 is a wiring diagram of the voltage limiter used in the circuit shown in Figures 1 and 2;

Figures 4, 5, 6 and 7 are graphs illustrating the manner of operation of the circuit shown in Figure 2, in which:

Figure 4 is a graph illustrating the wave form of the signal or wave in the recording portion of the probe circuit when it is exactly in phase with the current in the input circuit;

Figure 5 is a similar chart showing the signal or wave form when the current in the recording portion of the probe circuit is 90 electrical degrees out of phase with the current in the input circuit, and also indicating the effect of change of amplitude when 90 electrical degrees out of phase;

Figure 6 is another chart illustrating the wave form when it leads or lags the 90 degree out-of-phase position; and Figure 7 illustrates the condition obtained when

Figure 4:
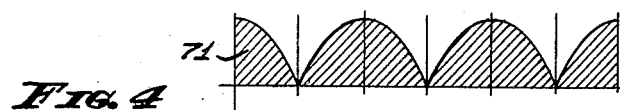

2 the phase leads or lags the 90-degree position, and the voltage produced in the probe circuit is "limited";

Figures 8, 9, 10, 11, 12, 13, 14 and 15 are graphs illustrating the manner of operation of the circuit shown in Figure 1, in which:

Figure 8 represents the wave form of the signal applied between A and E in Figure 1;

Figure 9 represents the wave form of the signal applied between A and B in Figure 1;

Figure 10 represents the wave form of the signal applied between A and B' in Figure 1;

Figure 11 represents the wave form of the combined signals applied between E and C in Figure 1;

Figure 12 represents the wave form of the combined signals applied between E and C' in Figure 1;

Figure 13 represents the wave form of the signal output appearing between 30 and D in Figure 1;

Figure 14 represents the wave form of the signal output appearing between 30 and D' in Figure 1; and Figure 15 represents the effective signal output appearing between D and D' at the galvanometer 28.

Reference is directed to Figure 1 of the drawing; An input circuit is provided which includes a Wheatstone bridge 1 having resistances 2, 3 and 4 forming three legs thereof. The fourth leg of the Wheatstone bridge comprises an insulated conductor 5 which may form an element of a multiple-conductor cable adapted to be lowered in to a well bore, at the lower end of which is movable electrode 6. The return circuit to the Wheatstone bridge is completed through the formation itself and a ground 7 or second input electrode.

A meter 8 is connected to two opposing corners of the Wheatstone bridge while a source of alternating current is connected to the other two corners thereof. The source in Figure 1 is a secondary coil 9 of a transformer 10.

The probe circuit includes a probe electrode 11 which is connected to an insulated conductor 12, which also may form an element of a multiple-conductor cable. The conductor 12 and a lead from a ground connection 13 or second probe electrode pass to a voltage limiter 14', indicated by outline in Figure 1 but shown in detail in Figure 3, and described hereinafter. The output from the voltage limiter is connected through conductors 15 and 16 to control grids 17 and 17' of tubes 18 and 18'.

The transformer 10 may have an additional secondary 19 which is connected through a voltage adjusting transformer or resistor 20 to an inductive coupling 21. Interposed between the secondary 19 and inductive coupling, subsequent to the regulating transformer 20, is a second voltage limiter 14. One end of the secondary 22 of the inductive coupling is connected through resistors 23 and 24 to the conductors 15 and 16. The other end of the secondary 22 is connected to a "C" battery 25 which in turn is connected to the cathodes 26 and 26' of the tubes 18 and 18'. In this arrangement the output from the voltage limiter 14' is converted to a pulsating current having variable unidirectional components and having pulsations in synchronism with the limited output of voltage limiter 14'.

The plates 27 and 27' of the tubes 18 and 18' are connected to the opposite ends of a center-tapped resistor 29 having an adjustable center tap 30 which is, in turn, connected through a "B" battery 31 to the commonly connected cathodes 26 and 26' of the said tubes 18 and 18' at a point adjacent the positive side of the "C" battery 25. A direct current galvanometer 28 is connected across the resistor 29, and serves as a phase indicating meter as hereinafter more fully described. In operation, center tap 30 is adjustable on the resistor 29 so that the meter 28 will indicate a zero reading when no alternating voltage is applied through the transformer 10. The grids 17 and 17' of the tubes 18 and 18' are preferably biased by the "C" battery 25, so as to operate the tubes in effect as grid controlled rectifiers passing only direct current pulses through their respective plate circuits from the battery 31.

The output from the voltage limiter 14' in the probe circuit is prevented by the action of the voltage limiting circuit from exceeding a predetermined amplitude, but is free to vary in phase in compliance with that induced by the inductance or capacitance effects of the formation being tested. The reference voltage which is supplied from the secondary 19 of the supply transformer 10 and through the voltage adjusting transformer 20 and the inductive coupling 21 is held constant and limited in amplitude by the action of the voltage limiter 14 preferably to a value equal to that applied between points A and B and between points A and B', across the resistances 23 and 24, respectively, located in the output side of the voltage limiter 14'. Changes in phase between the said reference potential applied by the secondary 22 of the transformer 21 and that of the potential picked up by the probe electrode circuits and introduced through conductors 15 and 16, result in unbalanced direct current components appearing between the outputs of the tubes 18 and 18' which are indicated in the meter 28. The methods of utilizing the circuits shown in Figure 1 to actuate the said meter 28 to indicate phase shifts, will be described in more detail hereinafter.

Reference is now directed to Figure 2: In the structure here shown mechanical means is substituted for portions of the electronic means in measuring the phase shift due to the inductive or capacitive effects of the formation. In the circuit here illustrated a source of alternating current 41, such as a motor-generator, is connected through a conductor 42, which may form an element of a multiple-conductor cable adapted to be lowered into the well bore and terminates in an input electrode 43. The other side of the alternating current source is connected through a resistance 44 and conductor 45 to a ground 46 or second input electrode.

The source of alternating current 41 may be mechanically coupled by a drive shaft 47 to a reference commutator 48. The reference commutator is provided with slip rings 49 which are electrically connected to opposite sides of the resistance 44 so that a voltage differential is maintained, and interposed in one of the connections is a variable resistance 50.

The brushes contacting the commutator segments 51 are connected to a reference meter 52. The commutator segments are so arranged on the shaft 47, with respect to the alternating current source 41, coupled thereto that they alternate the connections of the meter to the alternating current source in synchronism with the alternations of the electric current. Thus if the angular positions of the segments or brushes are adjusted with respect to one another so as to reverse commutate "in phase" with the alternating current source, that is, reverse the meter connections at the zero potential point of each alternating current cycle, full wave rectification is obtained such as shown in Figure 4.

A probe electrode 53 is provided which is connected through an insulated conductor 54, which may likewise form an element of a multiple-conductor cable, to a voltage limiter 57 similar or identical to the voltage limiters 14 and 14' in Figure 1. In addition, a ground 55, or second probe electrode, is connected through a conductor 56 to the voltage limiter. The output of the voltage limiter 57 is connected to a phase-displacing commutator or reversing commutator 58 which includes slip rings 59 to which the output is fed. In addition, the phase-displacing commutator is provided with commutator segments 60 and with the brushes bearing thereon which are connected to a phase-indicating meter 61. The phase-displacing commutator 58 is mounted on the drive shaft 47 with the reference commutator 48, and the commutator segments 60 are so arranged and the annular positions of the brushes so adjusted with respect to the commutator segments that the connections with the meter 61 are normally reversed in synchronism with the alternating current source at each peak voltage portion of each alternating current cycle, resulting in a modified alternating current in the meter 61 having the wave form illustrated in Figure 5.

Reference is directed to Figure 3: Here illustrated is a voltage limiter or "clipper" circuit which accomplishes the desired control of the voltage received from the probe circuit, and may be used in either of the alternative arrangements as shown at 14 and 14' in Figure 1, or as at 57 in Figure 2. The limiter per se is conventional and may be any one of the types commonly used in frequency modulated receivers, and may be preceded in the circuit by an amplifier, not shown, particularly when used in the probe circuit. The leads from the probe electrode 11 and ground 13, or probe electrode 53 and ground 55, or from secondary 19, as the case may be, are connected to the terminals of a primary winding 81 of a transformer 82. The transformer 82 is provided with split secondary comprising windings 83 and 84. Opposite ends of the windings 83 and 84 are connected to the plates 85 of a dual rectifier tube 86, the cathodes of which are grounded.

The other ends of the secondary windings 83 and 84 are connected through a suitable resistance network to grids 87 and 87' of tubes 88 and 89. The cathodes 90 and 90' of the two tubes 88 and 89 are connected to the common positive terminal of a "C" battery 91. A potentiometer 92 is connected across the said "C" battery and has an adjustable tap 32 which makes connections with the grounded center 33 of the said resistance network. The battery 91 thus serves to control the bias on the cathodes 90 and 90' with respect to the grids 87 and 87'. The plates 93 and 93' of the tubes 88 and 89 are connected to opposite ends of the center tap resistor 94 and an adjustable center tap 34 on the resistor 94 makes connection with a "B" battery 95. In operation the center tap, on resistor 94, is adjusted so as to balance out the effect of any unbalance in direct current components in the plate circuits of the tubes 88 and 89 which would otherwise have the effect of placing a fixed potential difference between the conductors 15 and 16 leading from the ends of the said resistor 94. The output of the voltage limiter as hereinbefore described may be applied through said conductors 15 and 16 to the slip rings 59, as shown in Figure 2, or to the primary of the inductive coupling 21 or across the resistance network comprising resistances 23 and 24, as shown in Figure 1, as the case may be.

The cathodes of the two tubes 88 and 89 are operated at a low temperature and, consequently, have a relatively low saturation current. The voltage applied to the grids is sufficiently high to produce saturation early in the cycle.

Figure 5:
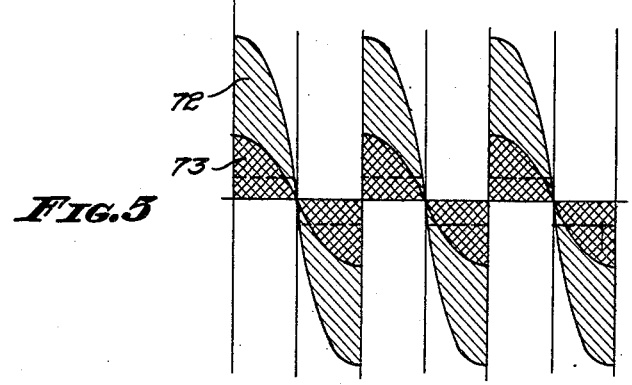

Reference is first directed to Figures 4 through 7: In the circuit shown in Figure 2 the wave form, as received by the phase-indicating meter 61, if the brushes on the cummutator 58 were adjusted so that commutation occurred when the supply voltage passed through zero, would be as shown by curve 71 in Figure 4 and the meter 28 would read maximum. However, the brushes on commutator 58 are shifted 90° so that in the absence of capacitive or inductive effects in the formation, the wave as received by the meter 61 is commutated as shown in Figure 5 and the meter reads zero. In Figure 5, the lighter shaded area 72 represents a maximum amplitude of the wave and the heavier shaded area 73 represents a minimum amplitude of the wave as might occur in the absence of a limiter device such as that employed at 57.

Figure 6:
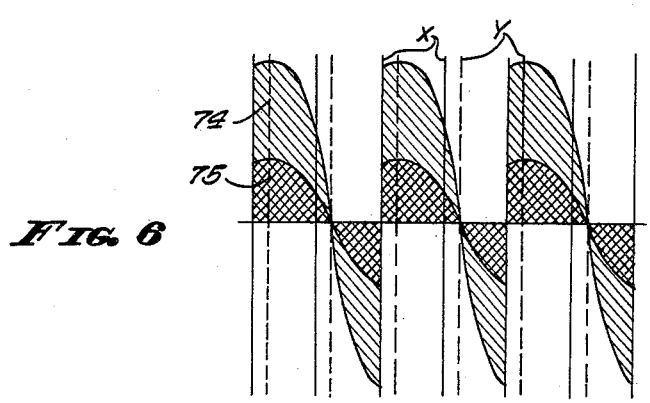

When a phase shift takes place, due to inductive or capacitive effects of the formation, the resulting wave after reverse commutation takes the forms shown in Figure 6; that is, the wave moves laterally with respect to the commutation point, thereby moving the zero node point from the solid line X to the dotted line Y. Such a phase shift causes an unbalance in the commutated wave, that is, it positions the wave with more of it above the zero line than below, which results in a partial rectification producing an alternating current having a direct current component which, in the absence of any amplitude variations, bears a functional relationship to the magnitude of said phase shift and which in turn causes a proportional deflection of the meter 61. This deflection of the meter may be calibrated as the out-of-phase component which it is desired to measure.

But in this unbalanced state another effect may take place. If the amplitude changes, which is often the case with formations causing phase shift, the resulting wave may appear as indicated by the lighter shaded area 74 in Figure 6. It will be seen by comparison of the heavier shaded area 75 in Figure 6 that although no further phase shift has taken place, the deflection of the galvanometer 61 will be greater for the larger amplitude than the smaller. This is undesirable since this additional deflection is the result of resistance change, and not phase change. A false indication of phase change would thus be effected by any amplitude changes occurring in the test signals applied to the commutator 58.

Figure 7:
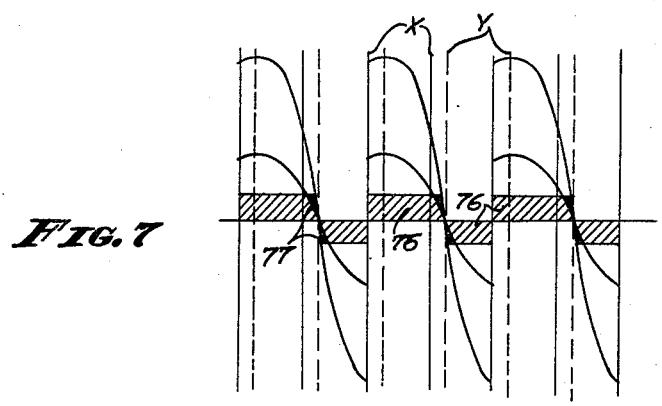

The crux of this invention is the incorporation of the voltage limiter in the circuit shown in Figure 2, whereby the tops of the waves are limited to any designated amplitude. The result may be a wave form 76 as illustrated in Figure 7. Here it may be seen that the amplitude changes cause only the change shown by the solid areas 77. If the top of the "clipped" or limited wave, as shown by 76, is below the amplitude of the normal minimum wave shown by the heavier shaded areas 73 and 75 in Figures 5 and 6, then the solid areas 77 above and below the zero point are equal. In fact, if the amplitude of the "clipped" wave is only a small percentage of the minimum wave the solid areas 77 become extremely small, too small to have any noticeable effect on the meter. Therefore, to all practical purposes the spurious effects due to changes in amplitude are entirely eliminated. In the arrangement in Figure 1 the two limiters are set to the same value.

It should be noted that while the wave forms shown in Figures 4 through 15 have been idealized, in actual practice the wave forms are not perfect and may be distorted. Regardless of the distortion of the wave form, the clipping or limiting of the voltage has the effect of producing almost a "square" wave form, which is the most ideal for the purpose of measuring phase shift.

Reference is now directed to Figures 8 through 15, which illustrate idealized wave forms occurring in the circuit shown in Figure 1. As has been explained in conjunction with Figures 4, 5, 6 and 7, by clipping or limiting the amplitude of the wave to a value which is small when compared with the minimum amplitude as received by the probe electrode, the effect of amplitude change is virtually eliminated. Therefore, in the consideration of Figures 8 through 15, only the clipped or limited signals corresponding to the shaded areas in Figure 7 are indicated and areas 77 are omitted. Also, in the circuit shown in Figure 1 the phase relationship between the voltages of the probe circuit and the voltage from the input circuit 19—20 are adjusted so that normally, that is, under conditions without capacitive or inductive effects, the voltage from the input circuit 21 is in phase with the probe voltage applied to the grid 17 of the tube 18 at C and 180° out of phase with the probe voltage applied to the grid of the other tube at C'.

Figure 8 shows a reference voltage wave form or signal, as applied between A and E from the voltage limiter 14 through the inductive coupling 21. This reference signal is maintained at constant amplitude by the action of the voltage limiter and will not vary or shift appreciably in phase. Figure 9 illustrates the wave form of the voltage applied between A and B, in Figure 1, from the voltage limiter 14', the normal in-phase condition being shown by the outline and cross-hatching in solid lines, while an out-of-phase condition is illustrated by the outline and cross-hatching in dotted lines. Figure 10 illustrates the appearance of the voltage wave in the in-phase and out-of-phase conditions as applied from the voltage limiter 14' between A and B', and these voltage waves are 180° out-of-phase with respect to those applied between A and B, as shown in Figure 9.

Figure 11 illustrates the signal or voltage wave form as impressed at E—C between the grid 17 of the tube 18 and the connection E at the negative terminal of the battery 25 of Figure 1. This signal at E—C is the algebraic sum of the signals A—E and A—B illustrated in Figures 8 and 9 respectively, showing by solid lines therein the resultant signal at E—C when the signal at A—B is in phase with the signal at A—E, and showing by dotted lines the resultant signal at E—C when the phase of A—B is displaced a given amount with respect to the phase of A—E. Similarly, Figure 12 shows the resultant signal or voltage wave form as impressed at the same time at E—C' between the grid 17' of the tube 18' and the connection E at the negative terminal of the battery 25 of Figure 1. This signal at E—C' is the algebraic sum of the signals A—E and A—B' illustrated in Figures 8 and 10 respectively and shows in dotted lines the resultant signal at E—C' when the phase of A—B' is displaced with respect to that of A—E by the same given amount as that illustrated in Figure 11. In the in-phase condition between the signals at A—E and A—B or the corresponding 180° out of phase condition between the signals at A—E and A—B' no signal appears at E—C' and hence no solid line wave form is shown in Figure 12 for this condition. A phase shift of the voltage in the probe circuit due to the change in the inductive or capacitive effects in the formation will cause the signal at A—B to be shifted out of phase with the signal A—E resulting in the out-of-phase condition illustrated for signal E—C in Figure 11 which in turn results in a reduction of the time duration of the unidirectional current pulses in the plate circuit 27, D—30 of tube 18, while at the same time causing an alternating signal potential to appear at E—C' between the grid connection C' of the tube 18' and the negative terminal of the battery 25. Since the battery 25 is normally of such a voltage as to bias both the tubes 18 and 18' to cut-off when no signal is applied across A—B only that portion of the signal corresponding to that applied at E—C and at E—C' which appears above the zero line as shown in Figures 11 and 12 remains. In other words only the positive pulses of the signals applied at E—C and E—C' appear as rectified unidirectional pulses in the plate circuits 27, D, 30 and 27', D', 30 of the tubes 18 and 18' respectively.

By reason of the fact that the meter 28 is connected from D to D' across the resistor 29 having a center tap 30, the pulsating signals D—30 and D'—30 affect the meter in opposition, that is, one signal is algebraically subtracted from the other. Therefore, the resulting signal affecting the meter 28 is a subtraction of waves D'—30 from waves D—30 or vice versa, as shown in Figure 15, again with the solid line portion indicating the in-phase condition and the dotted line portion the out-of-phase condition. Thus it will be observed that when there is no inductive or capacitive effect in the formation the meter will indicate a maximum position, and should there occur a phase shift the meter will indicate less than maximum. The amount of this differential is in proportion to the algebraic sum of the areas above and below the line in Figure 15 representing the out of phase condition subtracted from the area above the line which represents the in phase condition.

The arrangement shown in Figure 1 does not, of course, indicate whether the phase shift lags or leads and therefore does not distinguish between inductive and capacitive effects; whereas the arrangement shown in Figure 2 does indicate whether the shift is due to inductive or capacitive effects.

Various changes and alternate arrangements may be made within the scope of the appended claims, in which it is our intention to claim all novelty inherent in the invention.

We claim:

1. A method of electrically logging well bores, characterized by: establishing an alternating current field in the formation traversed by a well bore; establishing a probe circuit for electrically sampling said alternating current field; deriving from the alternating potential received by said probe circuit an alternating current in phase with the received potential; so limiting the amplitude of said derived alternating current that it remains substantially constant in amplitude regardless of amplitude changes in the received potential; commutating the derived alternating current in a manner to render its reversals by commutation approximately 90 electrical degrees out of phase with respect to the reversals of the alternating current field applied to the formation under a known set of formation conditions at a selected location in the well bore; probing the formation at a different location within said bore, and measuring the algebraic sum of current components resulting from such commutation while such different location is under investigation, to detect shifting of the phase of the alternating current in the formation due to inductive or capacitive characteristics of the formation at said different location.

2. A method of electrically logging well bores, characterized by: establishing an alternating current field in the formation traversed by a well bore; establishing a probe circuit for electrically sampling said alternating current field; deriving from the alternating potential received by said probe circuit an alternating current having a substantially fixed phase relationship with respect to that of the received potential; so limiting the amplitude of said derived alternating current that it remains substantially constant in amplitude regardless of amplitude changes in the received potential; commutating the derived alternating current in a manner to render its reversals by commutation approximately 90 electrical degrees out of phase with respect to the reversals of the alternating current field applied to the formation under a known condition at a selected location in the well bore; probing the formation at a different location within said bore, and measuring the algebraic sum of current components resulting from such commutation while said different location is under investigation, to detect shifting of the phase of the alternating current field in the formation due to inductive or capacitive characteristics of the formation at said different locations.

3. A method of electrically logging well bores characterized by: establishing an alternating current field in the formation traversed by a well bore; establishing a probe circuit for electrically sampling said alternating current field; deriving from the alternating potential received by said probe circuit an alternating current having a substantially fixed phase relationship with respect to that of the received potential; so limiting the amplitude of said derived alternating current that it remains substantially constant regardless of amplitude changes in the received potential; commutating the derived alternating current in a manner to render its reversals by commutation approximately 90 electrical degrees out of phase with respect to the reversals of the said derived alternating current under a known set of formation conditions at a selected location in the well bore; probing the formation at a different location within said bore and measuring the algebraic sum of current components resulting from such commutation while such different location is under investigation, to detect shifting of the phase of the alternating current field in the formation due to differences in the inductive or capacitive characteristics of the formation at said different locations with respect to said selected location.

4. A method of electrically logging well bores, characterized by: establishing an alternating electric field in formations traversed by a well bore; establishing a probe circuit for electrically sampling said alternating field in different locations in said formation; probing the formation at different locations within said bore; deriving from the alternating potentials received by said probe circuit first alternating currents having substantially fixed, constant phase relationships with respect to the potentials received by said probe circuit; deriving second alternating currents having a substantially fixed constant phase relationship with respect to that of said alternating electric field established in the formations; so limiting the amplitudes of said first and second derived alternating currents that they remain substantially constant in amplitude regardless of amplitude changes in the potentials from which they are derived; combining and converting the first and second alternating currents to produce a third current having a direct current component the magnitude of which is a measure of the phase shift between said first and second currents; and measuring the resultant third current to obtain an indication of the shift of phase between said first and second currents due to differences in the inductive or capacitive characteristics of the formation at said different locations.

5. A method of electrically logging well bores, characterized by: applying an alternating electric field to formations traversed by a well bore; establishing a probe circuit for electrically sampling portions of the resultant electrical field at different locations in said formations; sampling the resultant electrical fields in said formations; deriving from the electrical field portions thus sampled alternating currents having substantially constant phase angles with respect to those of said sampled field portions; so limiting the amplitude of said derived alternating currents that they remain substantially constant in amplitude regardless of amplitude changes in the sampled field portions; reverse commutating the thus derived and limited alternating currents in synchronism with the said alternating electric field applied to said formations to obtain resultant alternating currents having pulsating unidirectional current components having values which are a function of the phase shift of the sampled alternating field portions with respect to the alternating electric field applied to the formations; and measuring the resultant unidirectional current components to indicate shifting of the phase of the sampled alternating field portions in the formation due to inductive or capacitive characteristics of the formations at said different locations.

6. A method of electrically logging well bores, characterized by: passing an alternating electric current through formations traversed by a well bore; establishing a probe circuit for electrically sampling portions of the resultant electrical field at different locations in said formations; sampling the resultant electrical fields in said formations; deriving from the electrical field portions thus sampled alternating currents having substantially constant phase angles with respect to those of said sampled field portions; so limiting the amplitude of said derived alternating currents that they remain substantially constant in amplitude regardless of amplitude changes in the sampled field portions; reverse commutating the thus derived and limited alternating currents in synchronism with the said alternating current applied to said formations to obtain resultant alternating currents having pulsating unidirectional current components having values which are a function of the phase shift of the sampled alternating field portions with respect to the alternating current applied to the formations; and measuring the resultant unidirectional current components to indicate shifting of the phase of the alternating field in the formation due to inductive or capacitive characteristics of the formations at said different locations.

7. A method of electrically logging well bores, characterized by: applying an alternating electrical field at different locations in a well bore to formations traversed thereby; electrically sampling the electrical current flowing through said formations; deriving from the electrical currents thus sampled alternating currents having substantially constant phase angles with respect to said sampled currents; so limiting the amplitudes of said derived alternating currents that they remain substantially constant regardless of amplitude changes in the sampled currents; reverse commutating the thus derived and limited alternating currents in synchronism with and at a substantially constant phase angle with respect to that of the said alternating electric field applied to said formations to obtain resultant alternating currents having pulsating unidirectional current components having values which are a function of the phase shift of the sampled alternating currents with respect to the electric field applied to the formations; and measuring the resultant unidirectional current components of the thus commutated currents to indicate shifting of the phase of the alternating current in the formation due to inductive or capacitive characteristics of the formations at said different locations.

8. A method of electrically logging well bores, characterized by: flowing an alternating electric current through formations traversed by a well bore; sampling a portion of the alternating electric field in said formations; deriving from the said electric field thus sampled a first alternating potential having a substantially constant phase relationship with respect to the sampled field and an amplitude which is substantially constant regardless of amplitude changes in said sampled current; deriving a second alternating potential having a substantially constant phase relationship with respect to that of said alternating electric current flowing through said formations and an amplitude which is substantially constant regardless of amplitude changes in said applied potential; combining and converting the first and second alternating potentials to produce an alternating current having a direct current component the magnitude of which is independent of amplitude variations in the said current flowing through the formations and the said sampled field and is a measure of the phase shift between said first and second alternating potentials; and measuring the resultant alternating current to obtain an indication of the shift of phase between said first and second alternating potentials due to differences in the reactive characteristics of the said portion of said formations.

9. A method of electrically logging well bores, characterized by: applying an alternating potential at different locations in a well bore to formations traversed thereby; sampling the resultant electric current flowing through a portion of said formations; deriving from the said electric current thus sampled a first alternating potential having a constant phase angle with respect to said sampled electric current and an amplitude which is substantially constant regardless of amplitude changes in said sampled current; deriving a second alternating potential having a substantially constant phase angle with respect to said alternating potential applied to said formations and an amplitude which is substantially constant regardless of amplitude changes in said applied potential; combining and converting the first and second alternating potentials to produce a pulsating current having a direct current component the magnitude of which is a measure of the phase shift between said first and second alternating potentials; and measuring the resultant pulsating current to obtain an indication of the shift of phase of the alternating current in the formation due to differences in the reactive characteristics of the formations at said different locations.

10. A method of electrically logging well bores, characterized by: passing an alternating electric current through formations traversed by a well bore; establishing a probe circuit for electrically sampling portions of the resultant electric fields at different locations in said formations; deriving from the electric field portions thus sampled, alternating currents having substantially constant phase angles with respect to those of said sampled field portions; limiting the amplitude of said derived alternating currents so that they remain substantially constant in amplitude regardless of amplitude changes occurring in either the said current passed through the formations or in the said sampled field portions; converting the thus derived and limited alternating currents to pulsating currents having variable unidirectional components and having pulsations in synchronism with said derived and limited alternating currents; controlling said conversion by means operating in synchronism with the said alternating current passed through said formations and having a substantially fixed phase relationship thereto, to vary said unidirectional current components of said pulsating currents in accordance with a function of the phase difference between the said alternating current passed through the formations and the said derived alternating currents, to obtain therefrom unidirectional current components independent of amplitude variations of said sampled field portions and amplitude variations of said alternating current passed through said formations; probing the formations at different locations within said bore and measuring the said unidirectional current components resulting from said conversion to indicate thereby, a shifting of the phase of the sampled alternating field portions in the formation with respect to to said alternating current passed through said formations, due to differences in the inductive or capacitive characteristics of the formations at said different locations.

MELVIN E. CHUN.
JOHN C. STICK, Jr.

REFERENCES CITED

The following references are of record in the file of this patent:

UNITED STATES PATENTS

| Number | Name | Date |
| --- | --- | --- |
| 1,996,530 | Sundberg | Apr. 2, 1935 |
| 2,220,070 | Aiken | Nov. 5, 1940 |
| 2,229,604 | Silverman | Jan. 21, 1941 |
| 2,231,013 | Klipsch | Feb. 11, 1941 |
| 2,265,978 | Batchelder | Dec. 16, 1941 |
| 2,273,363 | Lipson | Feb. 17, 1942 |
| 2,277,707 | Lee | Mar. 31, 1942 |
| 2,358,441 | Bowsky | Sept. 19, 1944 |